US012010041B1

(12) United States Patent
Sharma et al.

(10) Patent No.: US 12,010,041 B1
(45) Date of Patent: Jun. 11, 2024

(54) DYNAMIC RESOURCE ALLOCATOR IN SECURE COMPUTATION AND COMMUNICATION

(71) Applicant: Lemon Inc., Grand Cayman (KY)

(72) Inventors: Sagar Sharma, Culver City, CA (US); Qiang Yan, Beijing (CN)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 18/317,457

(22) Filed: May 15, 2023

(51) Int. Cl.
*H04L 51/48* (2022.01)
*H04L 47/70* (2022.01)
*H04L 47/78* (2022.01)

(52) U.S. Cl.
CPC .......... *H04L 47/828* (2013.01); *H04L 47/788* (2013.01); *H04L 47/822* (2013.01); *H04L 51/48* (2022.05)

(58) Field of Classification Search
CPC ... H04L 47/828; H04L 47/788; H04L 47/801; H04L 47/806; H04L 47/822; H04L 47/821
USPC .............. 709/220, 224, 226, 228, 223, 225
See application file for complete search history.

(56) References Cited

U.S. PATENT DOCUMENTS

| | | | | |
|---|---|---|---|---|
| 7,197,038 B1* | 3/2007 | Cook | .................. | H04L 47/801 370/400 |
| 8,037,731 B2* | 10/2011 | Yabuki | .................... | B21J 5/06 72/352 |
| 11,501,258 B1* | 11/2022 | Thornton, II | .......... | H04L 67/02 |
| 11,568,137 B2* | 1/2023 | Sharma | .................. | G06Q 30/01 |
| 11,698,918 B2* | 7/2023 | Tokarev Sela | ........ | G06F 16/285 715/764 |
| 11,704,430 B2* | 7/2023 | Eberlein | ............... | G06F 16/125 726/1 |
| 2006/0049256 A1* | 3/2006 | von Mueller | ...... | G06Q 20/3552 705/64 |
| 2008/0091818 A1* | 4/2008 | Bailey | .................. | H04L 63/123 709/224 |

(Continued)

FOREIGN PATENT DOCUMENTS

CA 2308696 A1 * 11/2000 ............. H04L 12/14

OTHER PUBLICATIONS

McSherry, Frank D. "Privacy integrated queries: an extensible platform for privacy preserving data analysis." Proceedings of the 2009 ACM SIGMOD International Conference on Management of data. 2009.

(Continued)

*Primary Examiner* — Khanh Q Dinh
(74) *Attorney, Agent, or Firm* — HSML P.C.

(57) ABSTRACT

Dynamic allocation and/or distribution of a resource in secure computation and communication to achieve a desired level of data privacy protection is provided. A method for dynamically allocating a resource of a differentially private system in secure computation and communication includes aggregating attributes from a usage log of the differentially private system for a predetermined period of time, generating a moving aggregation based on the aggregated attributes, optimizing a first attribute of the attributes of the usage log based on the moving aggregation and a set of constraints, generating a distribution of the resource based on the optimized first attribute, and dynamically allocating the resource based on the generated distribution. The resource includes a differential privacy parameter.

20 Claims, 4 Drawing Sheets

(56) References Cited

U.S. PATENT DOCUMENTS

| | | | |
|---|---|---|---|
| 2008/0180050 A1* | 7/2008 | Gregori | H02H 7/0851 |
| | | | 318/434 |
| 2014/0229614 A1* | 8/2014 | Aggarwal | H04L 65/1063 |
| | | | 709/224 |
| 2018/0253533 A1* | 9/2018 | Warren | G16H 20/10 |
| 2019/0173753 A1* | 6/2019 | Correia e Costa | H04W 76/10 |
| 2020/0250235 A1* | 8/2020 | Abhyankar | G06F 40/30 |
| 2021/0342785 A1* | 11/2021 | Mann | H04L 51/48 |
| 2022/0297958 A1* | 9/2022 | Moreno | B25J 9/1664 |
| 2022/0398832 A1* | 12/2022 | Moliner | G06N 3/045 |

OTHER PUBLICATIONS

Johnson, Noah, et al. "Chorus: a programming framework for building scalable differential privacy mechanisms." 2020 IEEE European Symposium on Security and Privacy (EuroS&P). IEEE, 2020, https://arxiv.org/pdf/1809.07750.pdf.

Rogers, Ryan, et al. "LinkedIn's Audience Engagements API: A privacy preserving data analytics system at scale." arXiv preprint arXiv:2002.05839 (2020), https://arxiv.org/pdf/2002.05839.pdf.

Wilson, Royce J., et al. "Differentially private SQL with bounded user contribution." Proceedings on privacy enhancing technologies Feb. 2020 (2020): 230-250, https://arxiv.org/pdf/1909.01917.pdf.

Dwork, Cynthia, and Aaron Roth. "The algorithmic foundations of differential privacy." Foundations and Trends® in Theoretical Computer Science 9.3-4 (2014): 211-407; https://www.cis.upenn.edu/~aaroth/Papers/privacybook.pdf.

* cited by examiner

DYNAMIC RESOURCE ALLOCATOR IN SECURE COMPUTATION AND COMMUNICATION

FIELD

The embodiments described herein pertain generally to allocating a resource in a secure computation and/or communication. More specifically, the embodiments described herein pertain to dynamically allocating and/or distributing a resource in a secure computation and/or communication to achieve a desired level of data privacy protection for differential privacy protocols and/or algorithms.

BACKGROUND

Differential privacy (DP) protocols and algorithms have been used to provide robust data privacy protection. For each interactive query or operation from a data consumer to a dataset, DP protocols and algorithms may provide a certain level of data privacy protection (e.g., referred to as a differential privacy guarantee). The party that owns or hosts the dataset may add or inject noise into its dataset or into the query results of its dataset to achieve a desired level of data privacy protection for DP protocols or algorithms. In a differentially private data access and/or analytics system, efficient privacy budget allocation amongst data consumers in a group or among different queries by a data consumer may be critical to meet various privacy budget needs. The total privacy budget may set an upper bound on overall privacy loss due to a differential change in data. The available privacy budget may also affect the overall utility of results the DP system returns. Existing solutions may set a fixed privacy budget allocation for all data consumers in a group, or a fixed privacy budget for all queries in a data consumer's context.

SUMMARY

Features in the embodiments disclosed herein may provide dynamic allocation and/or distribution of a resource (e.g., privacy budget, etc.) to achieve a desired level of data privacy protection for the DP protocols or algorithms, given a group with several data consumers sharing the resource, by distributing the available resource across the data consumers such that the group may meet its overall utility goals or error goals.

Features in the embodiments disclosed herein may provide dynamic allocation and/or distribution of a resource (e.g., privacy budget, etc.) to achieve a desired level of data privacy protection for the DP protocols or algorithms, given a data consumer with a total available resource, by distributing the available resource across the data consumer's different queries such that the data consumer may meet the overall utility goals or error goals.

In one example embodiment, a method for dynamically allocating a resource of a differentially private system in secure computation and communication is provided. The method includes aggregating attributes from a usage log of the differentially private system for a predetermined period of time, generating a moving aggregation based on the aggregated attributes, optimizing a first attribute of the attributes of the usage log based on the moving aggregation and a set of constraints, generating a distribution of the resource based on the optimized first attribute, and dynamically allocating the resource based on the generated distribution. The resource includes a differential privacy parameter.

In another example embodiment, a secure computation and communication system is provided. The system includes a processor and a memory to store a usage log of a differentially private system. The usage log has a plurality of attributes. The processor is to aggregate the attributes of the usage log for a predetermined period of time, generate a moving aggregation based on the aggregated attributes, optimize a first attribute of the attributes of the usage log based on the moving aggregation and a set of constraints, generate a distribution of a resource of the differentially private system based on the optimized first attribute, and dynamically allocate the resource based on the generated distribution. The resource includes a differential privacy parameter.

In yet another example embodiment, a non-transitory computer-readable medium having computer-executable instructions stored thereon is provided. The instructions, upon execution, cause one or more processors to perform operations including aggregating attributes from a usage log of a differentially private system for a predetermined period of time, generating a moving aggregation based on the aggregated attributes, optimizing a first attribute of the attributes of the usage log based on the moving aggregation and a set of constraints, generating a distribution of a resource of the differentially private system based on the optimized first attribute, and dynamically allocating the resource based on the generated distribution. The resource includes a differential privacy parameter.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, a "data set" or "dataset" is a term of art and may refer to an organized collection of data stored and accessed electronically. In an example embodiment, a dataset may refer to a database, a data table, a portion of a database or data table, etc. It is to be understood that a dataset may correspond to one or more database tables, of which every column of a database table represents a particular variable or field, and each row of the database table corresponds to a given record of the dataset. The dataset may list values for each of the variables, and/or for each record of the dataset. It is also to be understood that a dataset may also or alternatively refer to a set of related data and the way the related data is organized. In an example embodiment, each record of a dataset may include field(s) or element(s) such as one or more predefined or predetermined identifications (e.g., membership identifications, user identifications, etc., such as user's name, e-mail address, phone numbers, etc.), and/or one or more attributes or features or values associated with the one or more identifications. It is to be understood that any user's identification(s) and/or user's data described in this document are allowed, permitted, and/or otherwise authorized by the user for use in the embodiments described herein and in their proper legal equivalents as understood by those of skill in the art.

As referenced herein, "differential privacy" or "DP" is a term of art and may refer to a standard, a protocol, a system, and/or an algorithm for publicly sharing information regarding a dataset by describing patterns of groups of elements within the dataset while withholding information about individual users to whom elements or records within the dataset correspond. It is to be understood that differential privacy may refer to a constraint on algorithms used to release aggregate information about a statistical dataset or database to a user (e.g., a data consumer, etc.), which limits the disclosure of private information of records for individuals whose information is in the dataset or database.

The following is a non-limiting example of the context, setting, or application of differential privacy. A trusted data owner (or data holder or curator, such as a social media platform, a website, a service provider, an application, etc.) may have stored a dataset of sensitive information about individuals (e.g., the dataset includes records/rows of individuals). Each time the dataset is queried (or operated, e.g. analyzed, processed, used, stored, shared, accessed, etc.), there may be a chance or possibility of an individual's privacy being compromised (e.g., probability of data privacy leakage or privacy loss). Differential privacy may provide a rigorous framework and security definition for algorithms that operate on sensitive data and publish aggregate statistics to prevent an individual's privacy from being compromised by, e.g., resisting linkage attacks and auxiliary information, and/or supplying a limit on a quantifiable measure of harm (privacy leakage, privacy loss, etc.) incurred by individual record(s) of the dataset.

It is to be understood that the above requirement of the differential privacy protocol or algorithm may refer to a measure of "how much data privacy is afforded (e.g., by a single query or operation on the input dataset) when performing the operations or functions?" A DP parameter "$\epsilon$" (a unit-less parameter) may refer to a privacy budget (i.e., a limit of how much data privacy it is acceptable with leaking), e.g., indicating a maximum difference between a query or operation on dataset A and the same query or operation on dataset A' (that differs from A by one element or record). The smaller the value of $\epsilon$ is, the stronger the privacy protection is for the multi-identification privacy-protection mechanism. Another DP parameter "$\delta$" (a unit-less parameter) may refer to a probability, such as a probability of information being accidentally leaked. In an example embodiment, a required or predetermined numeric value of $\epsilon$ may range from at or about 1 to at or about 3. The required or predetermined numeric value of $\delta$ may range from at or about 10-10 (or at about 10-8) to at or about 10-6. Yet another DP parameter sensitivity (a unit-less parameter) may refer to a quantified amount for how much noise perturbation may be required in the DP protocol or algorithm. It is to be understood that to determine the sensitivity, a maximum of possible change in the result may need to be determined. That is, sensitivity may refer to an impact a change in the underlying dataset may have on the result of the query to the dataset.

As referenced herein, "differential privacy composition" or "DP composition" is a term of art and may refer to the total or overall differential privacy when querying (or operating, e.g., analyzing, processing, using, storing, sharing, accessing, etc.) a particular dataset more than once. DP composition is to quantify the overall differential privacy (which may be degraded in view of the DP of a single query or operation) when multiple separate queries or operations are performed on a single dataset. It is to be understood that when a single query or operation to the dataset has a privacy loss L, the cumulative impact of N queries (referred to as N-fold composition or N-fold DP composition) on data privacy may be greater than L but may be lower than L*N. In an example embodiment, the number N may be at or about 10, at or about 25, or any other suitable number. In an example embodiment, $\epsilon$, $\delta$, sensitivity, and/or the number N may be predetermined to achieve a desired or predetermined data privacy protection goal or performance.

It is to be understood that the differential privacy requirements may be achieved via adding or injecting noise into the dataset studiously to form data anonymous, which may allow data consumers to execute all possible or useful statistical analysis on the dataset without identifying any personal information. It is also to be understood that adding controlled noise from a predetermined distributions (binomial distribution, Laplace distribution, normal/Gaussian distribution, etc.) may be a way of designing differentially private algorithms. It is further to be understood that adding noise may be useful for designing private protection mechanisms for real-valued functions on sensitive data.

It is also to be understood that when the differential privacy requirements ($\epsilon$, $\delta$, sensitivity, etc.) are met or achieved, a dataset operation (e.g., dataset access, dataset query, etc.) may be deemed as random and/or differentially private, making it almost impossible for an attacker to determine a user's record(s) and/or an individual record in the dataset. The dataset operations in the embodiments described herein may guarantee being differentially private (e.g., being ($\epsilon$, $\delta$)-differentially private, etc.). In an example embodiment, the dataset operations are deemed as "($\epsilon$, $\delta$)-differentially private" (i.e., differentially private based on the $\epsilon$ and $\delta$), if for any pair of (A, A') and every measurable set E in all potential output of M (a privacy-protection mechanism, such as a randomized algorithm, etc.) that may be predicted, the probability of (M(A)∈E) is less than or equal to e$\epsilon$×the probability of (M(A')∈E)+$\delta$, where $\epsilon$ is the Euler's number. The dataset operations in the embodiments described herein may be "($\epsilon$, $\delta$)-differentially private" for the provided $\epsilon$ and $\delta$.

It is further to be understood that a party that owns or hosts the dataset may add or inject noise into its dataset or into the query results of that dataset to achieve a desired level of data privacy protection for DP protocols or algorithms. As referenced herein, "error" or "error" of the noise results may refer to a difference between the real results and the noisy results (i.e., results having noise for DP data privacy protection) of the dataset operation. It is to be understood that error may be measured by error type. Error type may refer to a tunable parameter (e.g., a mean relative error type, a median relative error type, a root mean squared error type, etc.). That is, error may refer to a difference between the real results and the noisy results measured by a selected or predetermined error type.

Figure 1:
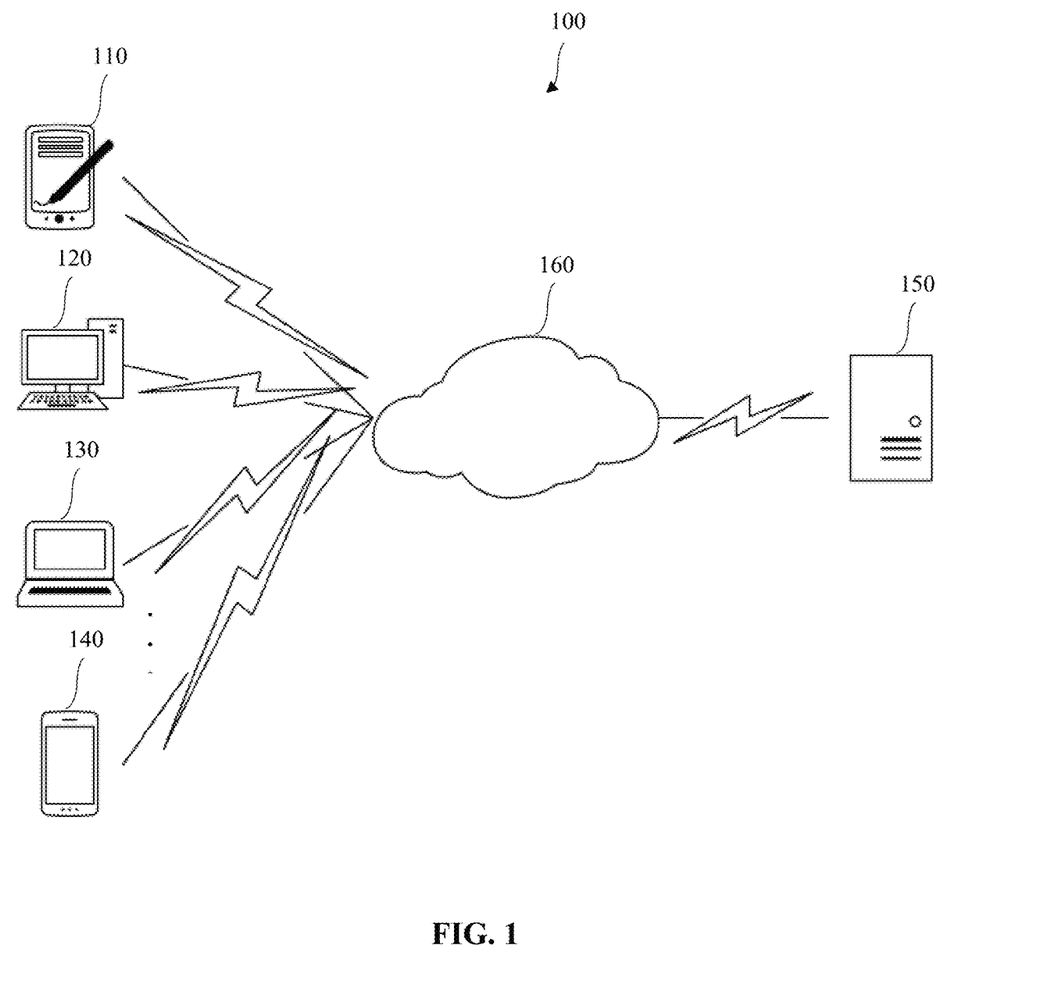
FIG. 1 is a schematic view of an example secure computation and communication system, arranged in accordance with at least some embodiments described herein.

FIG. 1 is a schematic view of an example secure computation and communication system 100, arranged in accordance with at least some embodiments described herein.

The system 100 may include terminal devices 110, 120, 130, and 140, a network 160, and a server 150. It is to be understood that FIG. 1 only shows illustrative numbers of the terminal devices, the network, and the server. The embodiments described herein are not limited to the number of the terminal devices, the network, and/or the server described. That is, the number of terminal devices, networks, and/or servers described herein are provided for descriptive purposes only and are not intended to be limiting.

In accordance with at least some example embodiments, the terminal devices 110, 120, 130, and 140 may be various electronic devices. The various electronic devices may include but not be limited to a mobile device such as a smartphone, a tablet computer, an e-book reader, a laptop computer, a desktop computer, and/or any other suitable electronic devices.

In accordance with at least some example embodiments, the network 160 may be a medium used to provide a communications link between the terminal devices 110, 120, 130, 140 and the server 150. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, the server 150 may be a server for providing various services to users using one or more of the terminal devices 110, 120, 130, and 140. The server 150 may be implemented by a distributed server cluster including multiple servers or may be implemented by a single server.

A user may use one or more of the terminal devices 110, 120, 130, and 140 to interact with the server 150 via the network 160. Various applications or localized interfaces thereof, such as social media applications, online shopping services, dataset operation services, or the like, may be installed on the terminal devices 110, 120, 130, and 140.

It is to be understood that software applications or services according to the embodiments described herein and/or according to the services provided by the service providers may be performed by the server 150 and/or the terminal devices 110, 120, 130, and 140 (which may be referred to herein as user devices). Accordingly, the apparatus for the software applications and/or services may be arranged in the server 150 and/or in the terminal devices 110, 120, 130, and 140.

It is also to be understood that when a service is not performed remotely, the system 100 may not include the network 160, but include only the terminal device 110, 120, 130, and 140 and/or the server 150.

It is further to be understood that the terminal device 110, 120, 130, and 140 and/or the server 150 may each include one or more processors, a memory, and a storage device storing one or more programs. The terminal device 110, 120, 130, and 140 and/or the server 150 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2:
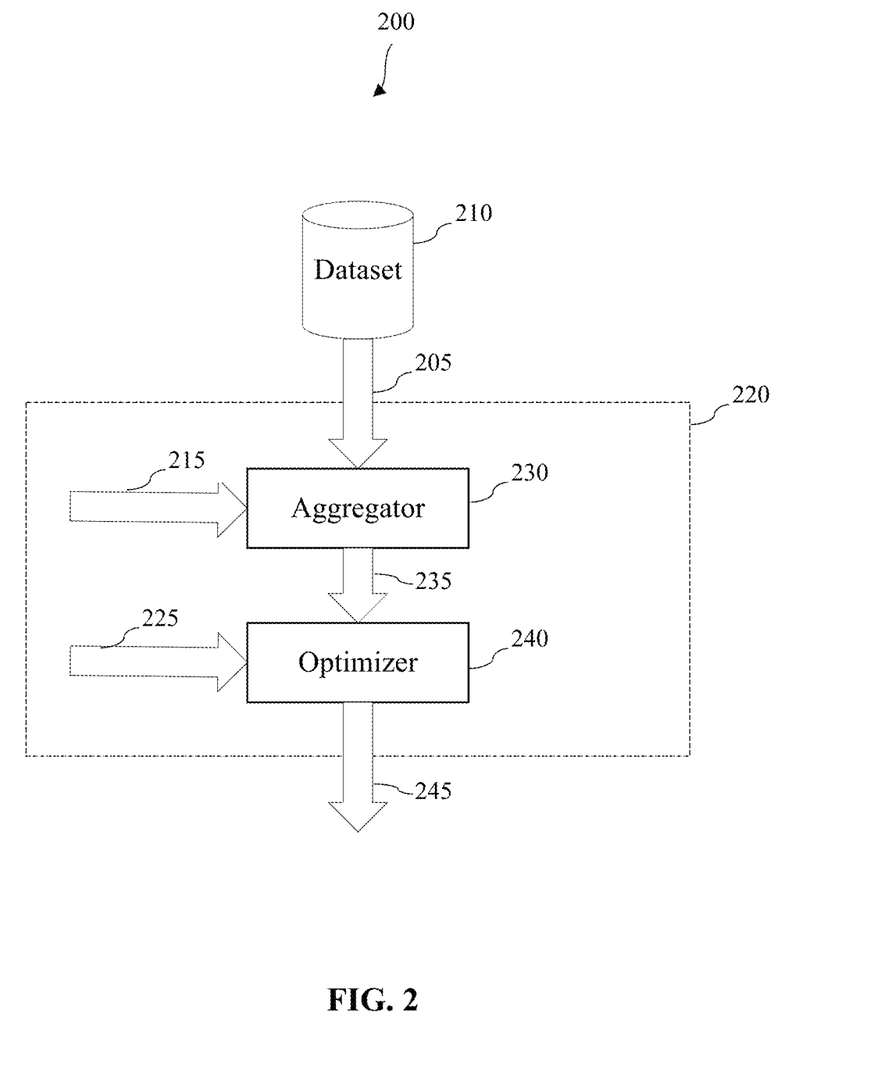
FIG. 2 is a schematic view of an example resource allocation system, arranged in accordance with at least some embodiments described herein.

FIG. 2 is a schematic view of an example resource allocation system 200, arranged in accordance with at least some embodiments described herein.

In an example embodiment, the system 200 may be a differentially private dataset access and/or analytics system. The system 200 includes at least a dataset 210 and a resource allocator 220. Operations (e.g., access, query, etc.) with regard to data elements or records stored in the dataset 210, individually or collectively, may be differentially private. That is, the dataset 210 may be protected by executing differential privacy (DP) protocols or algorithms.

In an example embodiment, information regarding operations (e.g., access, query, etc.) on the dataset 210 may be recorded or stored as a usage log 205 (e.g., a data consumer audit log, a DP system usage log, etc.), which may include a plurality of attributes with respect to the operations on the dataset 210 by the data consumer.

In an example embodiment, the attributes in the usage log 205 may include a timestamp recording the time when the operation (e.g., access, query, etc.) on the dataset 210 performed by a device corresponding to the data consumer occurs. The attributes may also include an identification of e.g., the operation, the data consumer, and/or a group of data consumers. The attributes may further include the DP parameters such as $\epsilon$ (epsilon, privacy budget) used by e.g., the operation, the data consumer, and/or the group; $\delta$ (delta, probability of information being accidentally leaked) used by e.g., the operation, the data consumer, and/or the group; $\epsilon$ allocated (e.g., by the DP system, etc.) to e.g., the operation, the data consumer, and/or the group; and/or $\delta$ allocated (e.g., by the DP system, etc.) to e.g., the operation, the data consumer, and/or the group. Also the attributes may include error, which may include, in an example embodiment, error of the noise results that indicate how far real dataset operation (access, query, etc.) results are from the noisy results (results having noise for DP data privacy protection).

In an example embodiment, the error may be determined based on e.g., a predetermined or selected error-type. The error-type may include e.g., a mean relative error type, a median relative error type, a root mean squared error type, etc. It is to be understood that the attributes in the usage log 205 may include one or more of the attributes described above and/or any other suitable attributes with respect to the operations on the dataset 210 by the data consumer.

As set forth above, in an example embodiment, the system 200 may include a resource allocator 220. The resource may be e.g., the total and/or available $\epsilon$, $\delta$, or any other suitable resource of the DP system with respect to e.g., operations of the dataset 210 in e.g., a predetermined period of time. The allocator 220 includes an aggregator 230 and an optimizer 240. The aggregator 230 may receive or obtain the usage log 205 as an input, and receive or obtain the input 215.

In an example embodiment, the input 215 may include a target duration unit (TDU). The TDU may be a predetermined duration of time (e.g., a day, a week, a month, etc.) for which the resource is to be allocated. The input 215 may also include a window size. The window size "k" may indicate how many TDUs are to be considered for a moving aggregation. For example, if the TDU is a day, the window size k is 7, and an aggregation for each day may be determined or generated, then a 7-day moving aggregation (aggregation for each of the past 7 days) of the attribute(s) of the usage log 205 may be determined or generated by the aggregator 230. The input 215 may further include a seasonality of e.g., the TDU or the window size of the TDU. For example, the seasonality may indicate e.g., the last or past k Monday, the last or past k March, a certain weighted values for months, quarters, years, etc. Also the input 215 may include an aggregation type. It is to be understood that an aggregation of the attributes of the dataset 210 may include statistics (counts, summary, average, etc.) of the attributes. In an example embodiment, the aggregation type can be a counts type, a summary type, an average type, etc. It is to be understood that each element of the input 215 may be predetermined, entered or selected by a user via a user interface, etc.

In an example embodiment, the aggregator 230 may receive or obtain the attributes of the usage log 205 and the input 215 as inputs. The aggregator 230 may e.g., first aggregates the attribute(s) of the usage log 205 per the input TDU (e.g., a day, a week, a month, etc. for which the resource, such as the privacy budget $\epsilon$, etc., is to be predicted). The aggregator 230 may also generate a windowed moving aggregation of the attribute(s), e.g., simple moving averages of the attribute(s) per data consumer for the past k (e.g., 7, etc.) days.

It is to be understood that in an example embodiment, $\epsilon$ (epsilon, privacy budget) may refer to a DP parameter known as, e.g., a of privacy loss that occurs with inclusion or exclusion of a record from the underlying dataset. It is to be understood that $\epsilon$ may be adjusted to balance privacy versus utility. Data utility may indicate how useful the data (or the dataset containing the data) is in view of the noise added to the data for privacy protection. For example, if the privacy budget $\epsilon$ is too small, using differential privacy may lead to poor data utility because too much noise may be added to the data rendering the data less useful or completely useless. If the privacy budget $\epsilon$ is too large, the use of differential privacy may lead to privacy leakage.

It is also to be understood that in an example embodiment, $\delta$ (delta) may refer to an approximate DP parameter that determines the probability of information accidentally being leaked independent of $\epsilon$. In an example embodiment, $\delta$ may be set to 1/size-of-dataset (e.g., the number of records/rows in the dataset). $\delta$ may affect data utility in certain ranges. $\epsilon_i$ may refer to the $\epsilon$ allocated to a data consumer i. (i may be a normalized value. $\delta_i$ may refer to the & allocated to a data consumer i. $\delta_i$ may be a normalized value. $\epsilon'_i$ may refer to $\epsilon$ allocated to a data consumer after optimization (e.g., being optimized by the optimizer 240). $\epsilon'_i$ may be a normalized value. $\delta'_i$ may refer to $\delta$ allocated to a data consumer after optimization. $\delta'_i$ may be a normalized value. $E_{type}$ may refer to a tunable parameter for error type (e.g., a mean relative error type, a median relative error type, a root mean squared error type, etc. "Error" may refer to a difference between the real results and the noisy results using the selected or predetermined $E_{type}$. For example, "Error" may indicate the difference between the real results and the noisy results (results having noise for DP data privacy protection) for a dataset operation (access, query, etc.). $E_i$ may refer to "Error" statistics for a data consumer i per TDU. For example, $E_i$ may be an average error per day, 0.95 percentile error per week, etc.

It is further to be understood that in an example embodiment, "N" may refer to the number of operations (e.g., queries, accesses, etc.) executed, performed, or requested by all data consumers in a group of data consumers per TDU. For example, "N" may be the average or the maximum number of operations (e.g., queries, accesses, etc.) per day or per week, etc. $N_i$ may refer to the number of operations (e.g., queries, accesses, etc.) executed, performed, or requested by user i. λ may refer to the error term in e.g., a set optimization problem. It is to be understood that an error term (which is a term of art in statistics, may refer to a residual, disturbance, or remainder term) may be a variable in a statistical model when the model does not represent the actual relationship between independent and dependent variables. "l" may refer to a tunable coefficient for an error term. γ may refer to a percentage of original parameter values. In an example embodiment, γ may specify an upper limit to change in the $\epsilon$ and/or $\delta$ values. $\gamma$ may be used as a guardrail that defines how aggressively the $\epsilon$ and/or $\delta$ changes may occur for the TDU.

In an example embodiment, the aggregator 230 may receive or obtain the attributes of the usage log 205, and aggregate the error ($E_i$), $\epsilon_i$, and the number of operations (e.g., queries, accesses, etc.) $N_i$. The aggregator 230 may generate the output 235. The output 235 may include e.g., $E_i$, $\epsilon_i$, and/or $c_i$ (which is $E_i/\epsilon_i$) as characteristics of the data consumers in the target group.

In an example embodiment, the aggregator 230 may process the usage log 205 to aggregate (e.g., generate statistics such as counts, sum, and/or averages) for the selected attributes per data consumer or per group for the TDU for which the resource ($\epsilon$, $\delta$, etc.) is set for. The aggregation may include one or more of the TDU (e.g., the day, etc.); the identification of e.g., the operation, the data consumer, and/or a group of data consumers including the data consumer; the average number of operations (accesses, queries, etc.); the average of the $\epsilon$ used by e.g., the operation, the data consumer, and/or the group; the average of the $\delta$ used by e.g., the operation, the data consumer, and/or the group; the average of the $\epsilon$ allocated to e.g., the operation, the data consumer, and/or the group; the average of the $\delta$ allocated to e.g., the operation, the data consumer, and/or the group; and/or the average of total error. It is to be understood that the aggregation may include any suitable aggregation of other attributes in the usage log 205.

In an example embodiment, the aggregator 230 may generate a moving aggregation of the attributes e.g., based on the aggregated attributes. For example, the aggregator 230 may generate moving averages (moving average is a term of art in statistics that captures the average change in a data series over time) of the attributes from the aggregated attributes, and the moving averages may be taken from the data/attributes from the past k (e.g., 7, etc.) TDUs (e.g., days).

It is to be understood that another aggregation such as weighted moving average, etc., instead of the simple moving average, may be used by the aggregator 230. Other moving measures such as the standard moving median, moving quantile, standard deviation, etc., may be used by the aggregator 230. The aggregator 230 may also account for seasonality as necessary, e.g., accounting for the time, the month, the day of operations (e.g., accesses, queries, etc.).

In an example embodiment, the optimizer 240 may receive or obtain the output 235 from the aggregator 230 as an input, and receive or obtain the input 225 as an input. The input 225 may be the Error goal ($E_{goal}$). It is to be understood that each element of the input 225 may be predetermined, entered or selected by a user via a user interface, etc. The optimizer 240 is to solve a resource ($\epsilon$, $\delta$, etc.) allocation problem as an optimization problem (e.g., with linear programming, etc.), and therefore outputs the breakdown of the resource ($\epsilon$, $\delta$, etc.). The optimizer 240 may set and solve an optimization problem with the aim of minimizing the overall error for each data consumer in the group and outputs $\epsilon_i$ for i=1, 2 ... k. In an example embodiment, the optimizer 240 may apply linear programming and execute algorithms such as the simplex algorithm (e.g., the Pulp library in Python, etc.) or the like to solve the problem.

It is to be understood that the problem of dynamically allocating a resource (e.g., the total privacy budget, etc. amongst the users in a group, etc.) may be set as a linear programming problem. In an example embodiment, the optimizer 240 may solve the linear programming problem by e.g., optimizing (e.g., minimizing, etc.) a variable (e.g., the overall error per data consumer, the overall error for a group of data consumers, the overall error per operation (e.g., query, access, etc.)) under a set of constraints.

In an example embodiment, the variable to be optimized may be the overall error for a group $$\left(\text{e.g.,} \sum_{i=1}^{k} E_i * \epsilon'_i + l * \lambda, \text{etc.}\right).$$

The set of constraints may include one or more of $$c_i * \epsilon'_i <= E_{goal} - \lambda, \quad (1)$$

$$\sum_{i=1}^{k} \epsilon'_i = 1.0, \quad (2)$$

$$\max(0, \epsilon_i - \gamma * \epsilon_i) <= \min(1, \epsilon_i + \gamma * \epsilon_i), \quad (3)$$

$$\lambda >= 0, \quad (4)$$

$$l <= 0, \quad (5)$$

where $\epsilon_i$ and $\epsilon'_i$ values are normalized (e.g., in the range of (0,1]), $E_i$=Error$_i$/$N_i$, $c_i$=$E_i$/$\epsilon_i$.

In an example embodiment, the optimizer 240 may use a linear programming solver (e.g., a simplex algorithm, etc.) to optimize the variable and output 245 (e.g. the optimized $\epsilon_i$ values, $\delta_i$ values, etc. for i=1, 2 ... k). The optimizer 240 may terminate (i.e., the optimization fails) without an output result if the target (e.g., the error goal ($E_{goal}$), etc.) is infeasible (e.g., the linear programming solver is not able to optimize the variable under the error goal constraint, etc.). In an example embodiment, the optimizer 240 may request the data consumer to re-adjust the target, and re-optimize the variable based on the adjusted target. It is to be understood that the $\gamma$ may serve as guard-rails to prevent the DP system from changing the resource ($\epsilon$, $\delta$, etc.) allocation values in a drastic manner and to promote gradual feedback into the DP system. It is to be understood that each element of the output 245 may be received and/or used by the DP system, the data consumer, etc., as the DP parameters for the next or subsequent operation (e.g., access, query, etc.) on the dataset 210.

Table 1 shows example inputs and outputs of the optimization process conducted by the optimizer 240. The $\epsilon_i$ column is the original $\epsilon$ allocation or distribution (input), where each data consumer (1, 2, 3, 4, and 5) is assigned 0.2 as their $\epsilon$. The $\epsilon'_i$ column is the optimized $\epsilon$ allocation or distribution (output), where each data consumer (1, 2, 3, 4, and 5) is assigned (0.5, 0.1, 0.2, 0.1, and 0.1) respectively as their optimized $\epsilon$. The error goal ($E_{goal}$, input) is set to 5.0 such that in the $c_i * \epsilon'_i$ column, the maximum value may be less than or equal to 5.0. The $\gamma$ (input, constraint) is set to 2.5.

TABLE 1

| ID | Error$_i$ | $\epsilon_i$ | $N_i$ | $E_i$ | $c_i = E_i/\epsilon_i$ | $c_i * \epsilon_i$ | $\epsilon'_i$ | $c_i * \epsilon'_i$ |
|---|---|---|---|---|---|---|---|---|
| 1 | 18 | 0.2 | 10 | 1. | 9 | 1.8 | 0.5 | 4.5 |
| 2 | 15 | 0.2 | 3 | 5 | 25 | 5 | 0.1 | 2.5 |
| 3 | 40 | 0.2 | 20 | 2 | 10 | 2 | 0.2 | 2 |
| 4 | 10 | 0.2 | 1 | 10 | 50 | 10 | 0.1 | 5 |
| 5 | 400 | 0.2 | 100 | 4 | 20 | 4 | 0.1 | 2 |
| | | | | | | 22.8 | | 16 |

As shown in Table 1, the overall error for the group of data consumers is reduced from 22.8 (the sum of the $c_i * \epsilon_i$ column) to 16 (the sum of the $c_i * \epsilon'_i$ column), which is about 30% reduction. It is to be understood that the resource ($\epsilon$, $\delta$, etc.) allocation recommended or optimized by the DP system may be fed back into the DP system for day to day resource participation. The aggregation and/or optimization process may continue and the next round of the optimization may be conducted based on new $E_i$, $\epsilon_i$, and/or $c_i$ values.

It is to be understood that the distribution/allocation of the resource ($\epsilon$, $\delta$, etc.) may be conducted amongst data consumers in a group. A similar approach may be built to distribute or allocate the resource among different query types per data consumer, or among different groups in a department. The optimization may be changed to achieve an overall goal (e.g., ($E_{goal}$) for the group instead of the goal (e.g., ($E_{goal}$) for each user. For example, one of the set of constraints for the optimizer 240 can be a constraint for a group $$\left( \sum_{i=1}^{k} c_i * \epsilon'_i <= E_{goal} - \lambda \right)$$

instead of for each user ($c_i * \epsilon'i <= E_{goal} - \lambda$).

It is also to be understood that there may be a linear relationship amongst the DP attributes and error terms. In other embodiments, there may be a non-linear relationship amongst the DP attributes and error terms, and that a non-linear programming problem may need to be solved. Instead of the simplex algorithm, other suitable optimization solvers such as the interior-point method, etc. may be used. In an example embodiment, a linear regression solution may also be applied for optimization. A different set of objective function (goals, etc.) and/or constraints may be applied to the optimizer 240.

Figure 3:
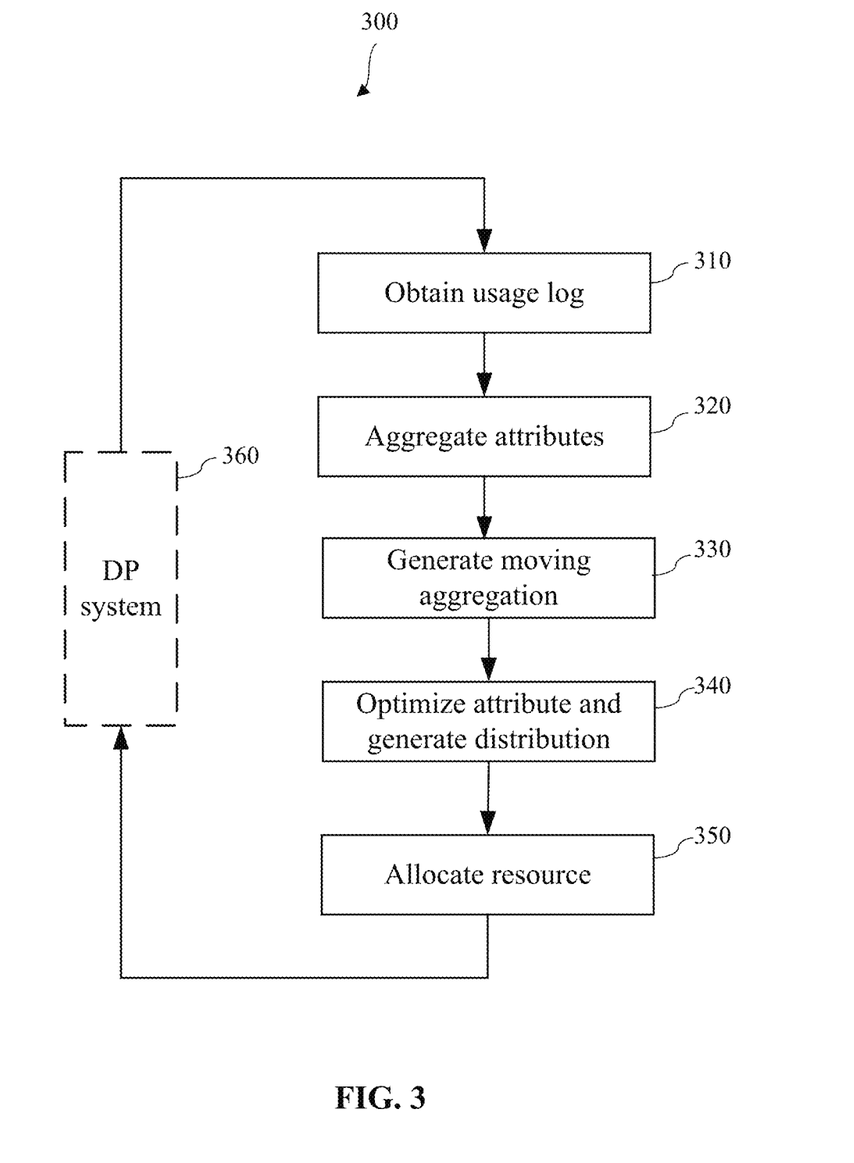
FIG. 3 is a flow chart illustrating an example processing flow for dynamically allocating and/or distributing resource in secure computation and/or communication, in accordance with at least some embodiments described herein.

FIG. 3 is a flow chart illustrating an example processing flow 300 for dynamically allocating and/or distributing resource ($\epsilon$, $\delta$, etc.) in secure computation and/or communication, in accordance with at least some embodiments described herein. It is to be understood that the processing flow 300 may include a processor performing the steps and/or operations described in FIG. 2.

Figure 4:
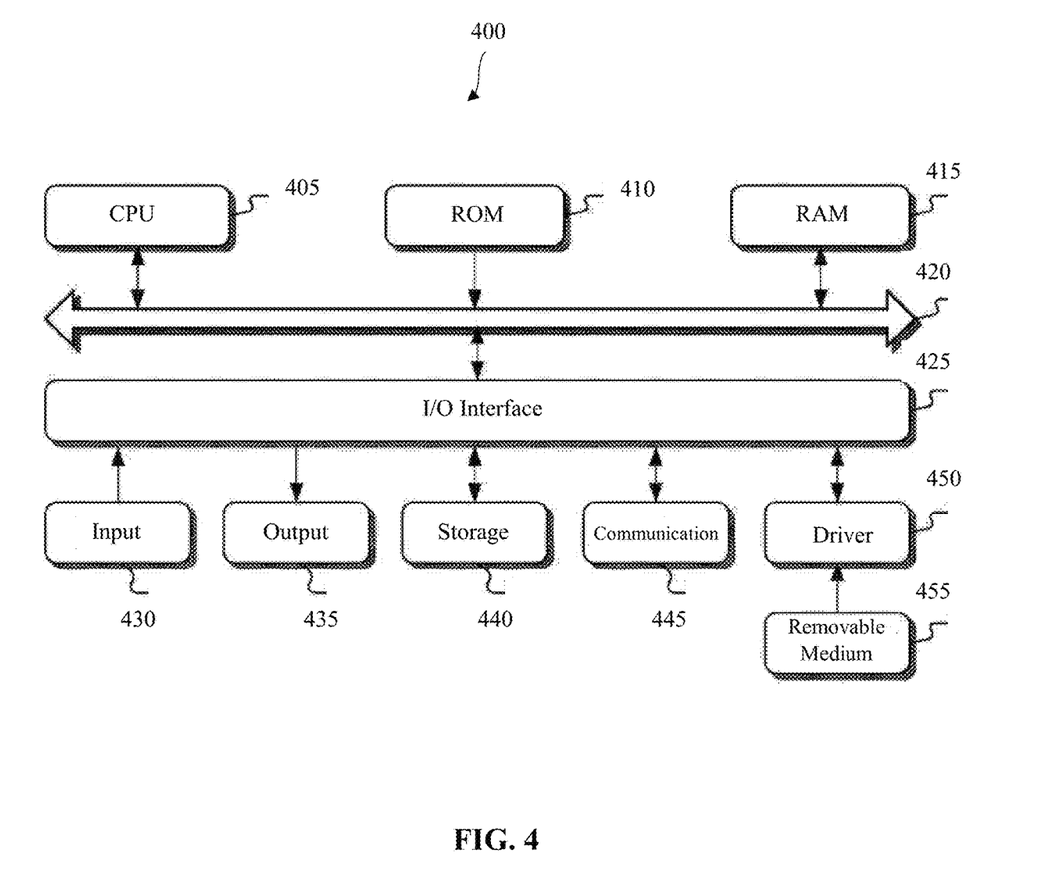
FIG. 4 is a schematic structural diagram of an example computer system applicable to implementing an electronic device, arranged in accordance with at least some embodiments described herein.

It is to be understood that the processing flow 300 disclosed herein can be conducted by one or more processors (e.g., the processor of one or more of the terminal device 110, 120, 130, and 140 of FIG. 1, the processor of the server 150 of FIG. 1, the central processor unit 405 of FIG. 4, and/or any other suitable processor), unless otherwise specified.

It is also to be understood that the processing flow 300 can include one or more operations, actions, or functions as illustrated by one or more of blocks 310, 320, 330, 340, and 350. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 300, operations including initializations or the like may be performed. For example, system parameters and/or application parameters may be initialized. For example, the resource ($\epsilon$, $\delta$, etc.) may be allocated to operations (accesses, queries, etc.), to data consumers, to a group or groups, etc. based on e.g., any suitable allocation scheme (e.g., a fixed allocation, etc.). It is to be understood that the processor may perform and/or execute the steps, functions, and/or operations of the allocator 220, the aggregator 230, and/or the optimizer 240 of FIG. 2. Processing flow 300 may begin at block 310.

At block 310 (Obtain usage log), the processor may obtain or receive a usage log (e.g., 205 of FIG. 2) e.g., from the DP system 360, the data consumer, etc. In an example embodiment, the processor may parse the usage log to retrieve attributes (see the description of the usage log 205 in FIG. 2) from the usage log. Processing may proceed from block 310 to block 320.

At block 320 (Aggregate attributes), the processor may aggregate the attributes for the TDU. See the description of the aggregator 230 in FIG. 2. Processing may proceed from block 320 to block 330.

At block 330 (Generate moving aggregation), the processor may generate a moving aggregation for the attributes for a window size (e.g., k) of TDUs. See the description of the aggregator 230 in FIG. 2. Processing may proceed from block 330 to block 340.

At block 340 (Optimize attributes and generate distribution), the processor may optimize a variable (e.g., an overall error) under a set of constraints, and generate recommended distribution of a resource ($\epsilon$, $\delta$, etc.) for operations (accesses, queries, etc.), for data consumers, for a group or groups, etc. See the description of the optimizer 240 in FIG. 2. Processing may proceed from block 340 to block 350.

At block 350 (Allocate resource), the processor may allocate the resource ($\epsilon$, $\delta$, etc.) based on the distribution of the resource ($\epsilon$, $\delta$, etc.) generated at block 340, to e.g., the DP system, the data consumer, etc. Processing may proceed from block 350 to back block 310.

It is to be understood that the allocation of the resource ($\epsilon$, $\delta$, etc.) at block 350 may be fed into the DP system 360 as new allocation, and the processor may continuously obtain or receive the usage log (e.g., 205 of FIG. 2) from the DP system 360 and/or the data consumers, which is generated based on the newly allocated resource ($\epsilon$, $\delta$, etc.). The allocated resource ($\epsilon$, $\delta$, etc.) may be received and/or used by the DP system, the data consumer, etc., as the DP parameters for the next or subsequent operation (e.g., access, query, etc.) on the dataset 210, and new or continuous usage log may be generated based on the newly allocated resource ($\epsilon$, $\delta$, etc.).

The processes of blocks 310, 320, 330, 340, and 350 may be repeated for continuous improvement of resource allocation or for continuous and dynamic resource allocation.

It is to be understood that when a resource ($\epsilon$, $\delta$, etc.) is divided among a number of data consumers fixedly or equally, the available resource ($\epsilon$, $\delta$, etc.) for the data consumer may be insufficient in some cases, whereas wasted in other cases. For example, a data consumer with a higher number of operations (e.g., queries, accesses, etc.) to execute, perform, or request may find the allocated resource ($\epsilon$, $\delta$, etc.) not sufficient to meet their utility needs. Whereas, data consumers or groups with a smaller number of operations (e.g., queries, accesses, etc.), the allocated resource ($\epsilon$, $\delta$, etc.) may be unnecessary. The features in the embodiments described herein may account for such issue by dynamically allocating the resource ($\epsilon$, $\delta$, etc.) and/or by using a lever that has a data consumer or a group target an error goal.

It is to be understood that the features in the embodiments described herein may provide a protocol or algorithm that dynamically divides the overall available resource ($\epsilon$, $\delta$, etc.) amongst data consumers in a group so as to optimize or minimize the overall target (e.g., the overall error, etc.) per user. The features in the embodiments described herein may also provide a protocol or algorithm that dynamically divides the overall available resource ($\epsilon$, $\delta$, etc.) amongst data consumers in a group so as to minimize the overall target (e.g., the overall error, etc.) for the whole group. The features in the embodiments described herein may further provide a protocol or algorithm that dynamically divides the overall available resource ($\epsilon$, $\delta$, etc.) amongst different operations (e.g., queries, accesses, etc.) a data consumer has so as to minimize the overall target (e.g., the overall error, etc.) per operation (e . . . , query, access, etc.). Also the features in the embodiments described herein may provide a protocol or algorithm that dynamically divides the overall available resource ($\epsilon$, $\delta$, etc.) amongst different operations (e.g., queries, accesses, etc.) a data consumer has so as to minimize the overall target (e.g., the overall error, etc.) for the user.

FIG. 4 is a schematic structural diagram of an example computer system 400 applicable to implementing an electronic device (for example, the server or one of the terminal devices shown in FIG. 1), arranged in accordance with at least some embodiments described herein. It is to be understood that the computer system shown in FIG. 4 is provided for illustration only instead of limiting the functions and applications of the embodiments described herein.

As depicted, the computer system 400 may include a central processing unit (CPU) 405. The CPU 405 may perform various operations and processing based on programs stored in a read-only memory (ROM) 410 or programs loaded from a storage device 440 to a random-access memory (RAM) 415. The RAM 415 may also store various data and programs required for operations of the system 400. The CPU 405, the ROM 410, and the RAM 415 may be connected to each other via a bus 420. An input/output (I/O) interface 425 may also be connected to the bus 420.

The components connected to the I/O interface 425 may further include an input device 430 including a keyboard, a mouse, a digital pen, a drawing pad, or the like; an output device 435 including a display such as a liquid crystal display (LCD), a speaker, or the like; a storage device 440 including a hard disk or the like; and a communication device 445 including a network interface card such as a LAN card, a modem, or the like. The communication device 445 may perform communication processing via a network such as the Internet, a WAN, a LAN, a LIN, a cloud, etc. In an embodiment, a driver 450 may also be connected to the I/O interface 425. A removable medium 455 such as a magnetic disk, an optical disk, a magneto-optical disk, a semiconductor memory, or the like may be mounted on the driver 450 as desired, such that a computer program read from the removable medium 455 may be installed in the storage device 440.

It is to be understood that the processes described with reference to the flowchart of FIG. 3 and/or the processes described in other figures may be implemented as computer software programs or in hardware. The computer program product may include a computer program stored in a computer readable non-volatile medium. The computer program includes program codes for performing the method shown in the flowcharts and/or GUIs. In this embodiment, the computer program may be downloaded and installed from the network via the communication device 445, and/or may be installed from the removable medium 455. The computer program, when being executed by the central processing unit (CPU) 405, can implement the above functions specified in the method in the embodiments disclosed herein.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects:

It is appreciated that any one of aspects can be combined with each other.

Aspect 1. A method for dynamically allocating a resource of a differentially private system in secure computation and communication, the resource including a differential privacy parameter, the method comprising: aggregating attributes from a usage log of the differentially private system for a predetermined period of time; generating a moving aggregation based on the aggregated attributes; optimizing a first attribute of the attributes of the usage log based on the moving aggregation and a set of constraints; generating a distribution of the resource based on the optimized first attribute; and dynamically allocating the resource based on the generated distribution.

Aspect 2. The method of aspect 1, wherein the optimizing of the first attribute includes minimizing the first attribute of the attributes of the usage log based on the moving aggregation and the set of constraints.

Aspect 3. The method of aspect 2, wherein the dynamically allocating of the resource includes dynamically allocating the resource amongst a plurality of users in a group.

Aspect 4. The method of aspect 2, wherein the dynamically allocating of the resource includes dynamically allocating the resource amongst a plurality of queries of a user.

Aspect 5. The method of aspect 3, wherein the optimizing of the first attribute includes optimizing the first attribute for each of the users in the group.

Aspect 6. The method of aspect 3, wherein the optimizing of the first attribute includes optimizing the first attribute for the group.

Aspect 7. The method of aspect 4, wherein the optimizing of the first attribute includes optimizing the first attribute for each of the queries.

Aspect 8. The method of aspect 4, wherein the optimizing of the first attribute includes optimizing the first attribute for the user.

Aspect 9. The method of any one of aspects 1-8, further comprising: generating an alert when the optimizing of the first attribute fails.

Aspect 10. The method of any one of aspects 1-9, further comprising: adjusting a target of the first attribute when the optimizing of the first attribute fails; and re-optimizing the first attribute based on the adjusted target.

Aspect 11. A secure computation and communication system, the system comprising: a memory to store a usage log of a differentially private system, the usage log having a plurality of attributes; a processor to: aggregate the attributes of the usage log for a predetermined period of time; generate a moving aggregation based on the aggregated attributes; optimize a first attribute of the attributes of the usage log based on the moving aggregation and a set of constraints; generate a distribution of a resource of the differentially private system based on the optimized first attribute, the resource including a differential privacy parameter; and dynamically allocate the resource based on the generated distribution.

Aspect 12. The system of aspect 11, wherein the processor is to further: minimize the first attribute of the attributes of the usage log based on the moving aggregation and the set of constraints.

Aspect 13. The system of aspect 12, wherein the processor is to further: dynamically allocate the resource amongst a plurality of users in a group.

Aspect 14. The system of aspect 12, wherein the processor is to further: dynamically allocate the resource amongst a plurality of queries of a user.

Aspect 15. The system of any one of aspects 11-14, wherein the processor is to further: adjust a target of the first attribute when the optimizing of the first attribute fails; and re-optimize the first attribute based on the adjusted target.

Aspect 16. A non-transitory computer-readable medium having computer-executable instructions stored thereon that, upon execution, cause one or more processors to perform operations comprising: aggregating attributes from a usage log of a differentially private system for a predetermined period of time; generating a moving aggregation based on the aggregated attributes; optimizing a first attribute of the attributes of the usage log based on the moving aggregation and a set of constraints; generating a distribution of a resource of the differentially private system based on the optimized first attribute, the resource including a differential privacy parameter; and dynamically allocating the resource based on the generated distribution.

Aspect 17. The computer-readable medium of aspect 16, wherein the optimizing of the first attribute includes minimizing the first attribute of the attributes of the usage log based on the moving aggregation and the set of constraints.

Aspect 18. The computer-readable medium of aspect 17, wherein the dynamically allocating of the resource includes dynamically allocating the resource amongst a plurality of users in a group.

Aspect 19. The computer-readable medium of aspect 17, wherein the dynamically allocating of the resource includes dynamically allocating the resource amongst a plurality of queries of a user.

Aspect 20. The computer-readable medium of any one of aspects 16-19, the operations further comprise: adjusting a target of the first attribute when the optimizing of the first attribute fails; and re-optimizing the first attribute based on the adjusted target.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for dynamically allocating a resource of a differentially private system in secure computation and communication, the method comprising:
   providing a usage log including operation information of the differentially private system, the differentially private system having a privacy budget parameter indicative of a strength of a data privacy protection and a probability parameter indicative of a data privacy loss;
   aggregating attributes from the usage log of the differentially private system for a predetermined period of time, the privacy budget parameter and the probability parameter forming at least a part of the attributes;
   generating a windowed moving aggregation based on the aggregated attributes;
   optimizing a first attribute of the attributes of the usage log based on the windowed moving aggregation and a set of constraints to minimize an overall error of the first attribute, the set of constraints including a number of query operations of the differentially private system;
   generating a distribution of the resource based on the optimized first attribute; and
   dynamically allocating the resource based on the generated distribution.

2. The method of claim 1, wherein the dynamically allocating of the resource includes dynamically allocating the resource amongst a plurality of users in a group.

3. The method of claim 2, wherein the optimizing of the first attribute includes optimizing the first attribute for each of the users in the group.

4. The method of claim 2, wherein the optimizing of the first attribute includes optimizing the first attribute for the group.

5. The method of claim 1, wherein the dynamically allocating of the resource includes dynamically allocating the resource amongst a plurality of queries of a user.

6. The method of claim 5, wherein the optimizing of the first attribute includes optimizing the first attribute for each of the queries.

7. The method of claim 5, wherein the optimizing of the first attribute includes optimizing the first attribute for the user.

8. The method of claim 1, further comprising:
   generating an alert when the optimizing of the first attribute fails.

9. The method of claim 1, further comprising:
   adjusting a target of the first attribute when the optimizing of the first attribute fails; and
   re-optimizing the first attribute based on the adjusted target.

10. The method of claim 1, wherein the first attribute includes at least one of the privacy budget parameter and the probability parameter of the differentially private system.

11. The method of claim 1, wherein the optimizing of the first attribute includes minimizing an error statistics of the first attribute for a predetermined error type, the set of constraints includes an error goal for the first attribute.

12. The method of claim 11, wherein the optimizing of the first attribute includes minimizing the error statistics based on an error term, and the set of constraints includes the error term.

13. The method of claim 12, wherein the set of constraints includes a limit of a change of the first attribute during the optimizing of the first attribute.

14. A secure computation and communication system, the system comprising:
   a memory to store a usage log of a differentially private system, the usage log including operation information of the differentially private system, the differentially private system having a privacy budget parameter indicative of a strength of a data privacy protection and a probability parameter indicative of a data privacy loss, the usage log having a plurality of attributes;
   a processor to:
      aggregate the attributes of the usage log for a predetermined period of time, the privacy budget parameter and the probability parameter forming at least a part of the attributes;
      generate a windowed moving aggregation based on the aggregated attributes;
      optimize a first attribute of the attributes of the usage log based on the windowed moving aggregation and a set of constraints to minimize an overall error of the first attribute, the set of constraints including a number of query operations of the differentially private system;
      generate a distribution of a resource of the differentially private system based on the optimized first attribute; and
      dynamically allocate the resource based on the generated distribution.

15. The system of claim 14, wherein the processor is to further:
   dynamically allocate the resource amongst a plurality of users in a group.

16. The system of claim 14, wherein the processor is to further:
   dynamically allocate the resource amongst a plurality of queries of a user.

17. The system of claim 14, wherein the processor is to further:
   adjust a target of the first attribute when the optimizing of the first attribute fails; and
   re-optimize the first attribute based on the adjusted target.

18. A non-transitory computer-readable medium having computer-executable instructions stored thereon that, upon execution, cause one or more processors to perform operations comprising:
   providing a usage log including operation information of a differentially private system, the differentially private system having a privacy budget parameter indicative of a strength of a data privacy protection and a probability parameter indicative of a data privacy loss;
   aggregating attributes from the usage log of a differentially private system for a predetermined period of time, the privacy budget parameter and the probability parameter forming at least a part of the attributes;
   generating a windowed moving aggregation based on the aggregated attributes;
   optimizing a first attribute of the attributes of the usage log based on the windowed moving aggregation and a set of constraints to minimize an overall error of the first attribute, the set of constraints including a number of query operations of the differentially private system;

generating a distribution of a resource of the differentially private system based on the optimized first attribute; and dynamically allocating the resource based on the generated distribution.

19. The computer-readable medium of claim 18, wherein the dynamically allocating of the resource includes dynamically allocating the resource amongst a plurality of users in a group.

20. The computer-readable medium of claim 18, wherein the dynamically allocating of the resource includes dynamically allocating the resource amongst a plurality of queries of a user.

* * * * *